Figure 1:
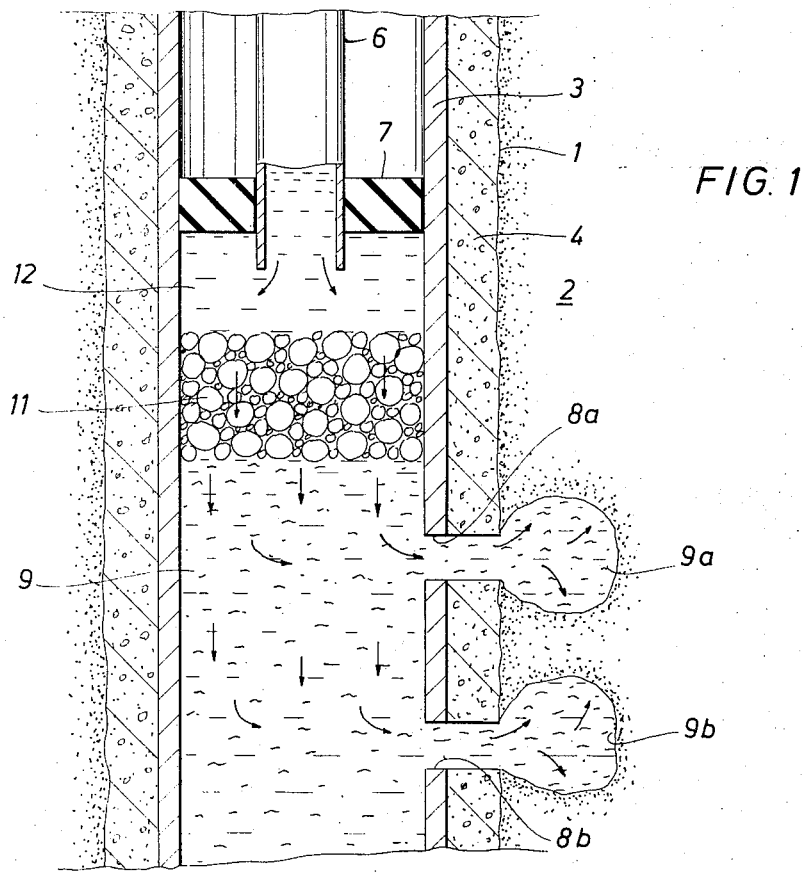

United States Patent [19]
Karnes

[11] 3,826,310
[45] July 30, 1974

[54] PLUG-DISPLACED SANDPACKING PROCESS

[75] Inventor: George Thomas Karnes, Houston, Tex.

[73] Assignee: Shell Oil Company, Houston, Tex.

[22] Filed: Jan. 18, 1973

[21] Appl. No.: 324,702

[52] U.S. Cl.............. 166/276, 166/291, 166/305 R
[51] Int. Cl......................................... E21b 43/02
[58] Field of Search .......... 166/276, 278, 284, 291, 166/292, 294, 295, 296, 300, 305 R

[56] References Cited
UNITED STATES PATENTS

| | | | |
|---|---|---|---|
| 2,981,334 | 4/1961 | Powell | 166/276 |
| 3,028,914 | 4/1962 | Flickinger | 166/284 |
| 3,123,138 | 3/1964 | Robichaux | 166/295 |
| 3,174,546 | 3/1965 | Flickinger | 166/284 |
| 3,208,529 | 9/1965 | Corley | 166/300 |
| 3,233,673 | 2/1966 | Spain et al. | 166/300 |
| 3,294,168 | 12/1966 | Bezemer et al. | 166/295 |
| 3,367,420 | 2/1968 | Jennings et al. | 166/284 |
| 3,489,877 | 1/1970 | Methuen | 166/295 |
| 3,613,790 | 10/1971 | Stout et al. | 166/295 |

Primary Examiner—Frank L. Abbott
Assistant Examiner—Jack E. Ebel
Attorney, Agent, or Firm—Howard W. Coryell

[57] ABSTRACT

A slurry of resin, sand and oil, for forming a sand or gravel pack in a well, is injected ahead of a mass of solid particles that form chemically removable plugs across the openings of well casing perforations into which the slurry is injected.

9 Claims, 2 Drawing Figures

PATENTED JUL 30 1974
3,826,310

3,826,310

PLUG-DISPLACED SANDPACKING PROCESS

BACKGROUND OF THE INVENTION

The invention relates to a well treatment, such as a sand controlling treatment for forming a resin consolidated permeable mass of sand or gravel in or around a cased and perforated portion of a well borehole.

Previously proposed sand controlling processes have utilized effective procedures for formulating pack-forming slurries to be displaced into wells. For example, such slurries containing a coupling agent to improve the resin-to-sand bonding between each grain and its coating are described in U.S. Pat. No. 3,285,339. The E. H. Bruist, T. W. Hamby and T. A. Simon, U.S. Pat. No. 3,621,915, discloses pack-forming slurries in which the resin-to-resin bonding between adjacent resin-coated grains is improved by using a self-curing polar-solvent-containing epoxy resin and a grain-suspending liquid which is partially but incompletely miscible with the resin solvent.

The prior pack-forming slurries are often adapted to form resin consolidated sand or gravel packs that are strong and permeable. However, field experience has indicated that the permeability of the packs formed by the prior pack placement procedures tend to be relatively quickly impaired. In addition to the packs becoming plugged by inflowing grains of reservoir sand, unless the packs are emplaced by a relatively time consuming and expensive procedure, they may fail to fill all of the perforations or may fail to stay within the perforations they have filled. In order to avoid such failures, prior pack-forming processes have used procedures such as positioning the pack-forming slurry within the interior of the perforated casing as well as the casing perforations and the voids within the reservoir. Subsequently the consolidated pack that forms within the casing must be drilled out—and this is both expensive and time consuming.

A gravel packing process that provides a relatively fine-grained, reservoir-sand-excluding outer zone around a relatively highly permeable inner zone, is disclosed in U.S. Pat. No. 3,695,355. That arrangement provides an efficient distribution of the relative permeabilities of the packing materials; but the placement of the pack may require the packing and drillingout of the casing interior, in order to avoid a subsequent displacement of the packing materials.

SUMMARY OF THE INVENTION

The present invention relates to treating a well by injecting a slurry of packing grains, self-curing resin, and carrier liquid, to form a permeable resin-consolidated mass of grains in or around a cased and perforated section of well casing ahead of a fluid-transported mass of solid particles that have a size and composition adapted to form chemically-removable plugs across the openings of casing perforations that have been filled with the slurry. Substantially all of the slurry is displaced from the casing interior into the perforations in the perforated section of the casing. After allowing the pack-consolidating resin to cure, the chemically removable plugs are chemically removed.

In addition, the invention relates to a well treating process in which a treating fluid of substantially any kind is so displaced into the earth formations around a perforated section of well casing. The formation and retention of the chemically-removable plugs across the openings of the perforations ensures the retention of a continuous body of the treating fluid throughout the opening within the casing and cement and the adjacent portion of earth formations. Such a treating fluid can advantageously be a sand consolidating fluid, e.g., one from which a self-curing epoxy resin formulation is deposited; a plugging fluid such as a resin or gel-forming fluid which becomes solid or highly viscous throughout the space it occupies; or the like treating fluid. The forming and retaining of the chemically-removable plugs across the openings of the perforations avoid the treating fluid overflushing that is substantially unavoidable when other procedures are used to emplace the treating fluid. For example, in a plugging treatment this ensures the plugging of all of the porous space from within the casing wall to within the adjacent earth formation and thus avoids any leakage through cracks or micro-fractures in or around the casing and cement sheath.

DRAWINGS

Figure 2:
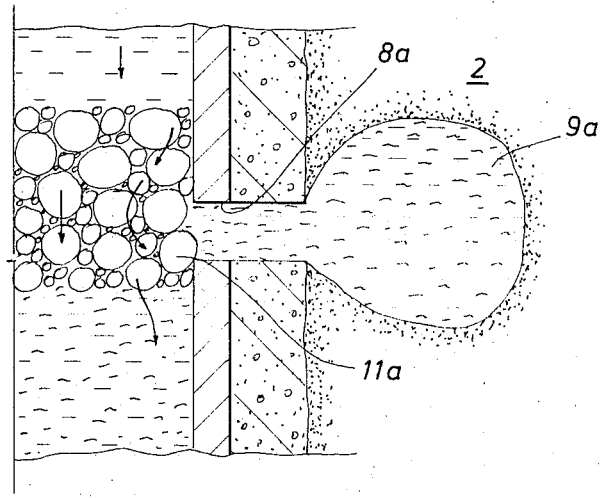

FIGS. 1 and 2 are schematic illustrations of a portion of a subterranean reservoir that contains a portion of a cased and perforated well borehole in which this invention is being practiced.

DESCRIPTION OF THE INVENTION

The present invention is, at least in part, premised on a discovery that it is feasible to temporarily plug the openings of well casing perforations while those perforations are filled with a treating fluid such as a pack-forming slurry within which a pack-consolidated resin is curing around the grains transported by the slurry. The plugging is preferably effected by injecting the pack-forming slurry ahead of a mass of plug-forming solid particles that (1) have densities adapting them to float on top of but stay adjacent to the slurry, (2) have sizes adapting them to bridge-across and plug the frontal portions of the perforations (e.g., by containing particles having effective diameters ranging from relatively small sizes to sizes equaling at least about one-third of the diameter of the perforations), (3) include particles having compressive strengths and deformability properties adapting them to form such bridge-plugs that will withstand a pressure differential of at least about 100 psi while allowing little or no flow through the plugs, and (4) include at least a significant proportion of particles that are relatively soluble in a fluid which is relatively inert to the well conduits.

The present injection procedure tends to form a fluid-tight moving plug or sliding seal across the rear of the slug of pack-forming slurry or other treating fluid during the displacement of that slurry or fluid through the injection tubing and the well casing. The plug keeps the liquid within and behind the slurry from bypassing and moving ahead of the suspended packing grains, and thus, tends to prevent a premature sandout within the tubing or casing.

As known to those skilled in the art, a sandout, or settling-out of suspension of a mass of suspended grains, commonly occurs when the concentration of the grains in the slurry becomes too high, and/or the state of agitation of the slurry becomes too low, relative to the amount by which the specific gravity of the suspended grains exceeds that of the suspending liquid. It is also affected by the effective viscosity of the suspending liquid, the shapes of the suspended grains, and the like factors. Whenever the liquid components of a slurry tend to bypass the suspended grains, the resulting concentration effects of the jamming together of the bypassed grains are apt to cause a sandout.

In the present process, the moving plug across the rear of the pack-forming slurry tends to allow the injection pressure that is applied to the fluid that displaces the slurry and the mass of plug-forming particles to be substantially as high as desired. For example, a high pressure can be applied to squeeze a significant amount of the pack-forming slurry through the perforations and into the reservoir, without creating a risk of causing a sandout within the casing.

FIG. 1 of the drawing shows a borehole 1 in an unconsolidated reservoir sand 2 containing a casing 3 surrounded by a sheath of cement 4. A string of tubing 6 and packer 7 have been inserted and perforations 8a and 8b have been opened through the casing and cement. As shown by the arrows, a pack-forming slurry 9 is being displaced through the casing and perforations and into the reservoir.

As known to those skilled in the art, when a viscous fluid is injected into an unconsolidated reservoir sand, the sand tends to be deformed in a plastic-like manner. As shown in FIGS. 1 and 2 this tends to form radially expanding portions of slurry, portions 9a and 9b, within the reservoir sand.

The slurry 9 is displaced into the well casing immediately ahead of a mass of plug-forming solid particles 11 which are fluid-transported by a displacing fluid 12. The slurry is initially displaced into both upper and lower perforations, such as 8a and 8b. When an upper perforation is reached by the plugging particles 11, a bridge-plug 11a forms across and seals-off the opening into the perforation. As long as at least one lower perforation is open, the fluids and particles in the casing are displaced downward as the slurry flows into the open perforation. When all of the perforations have been filled with the slurry and plugged by the following plug-forming particles, the flow out of the casing is stopped. This stoppage is signaled by a distinctive rise in the pressure required to pump the displacing fluid 12 into the casing. As known to those skilled in the art, similar but smaller pressure increases accompany the filling and plugging of each of the perforations.

After the pack-forming slurry has been displaced into the preforations, the fluids in and around the casing are allowed to remain static so that resin-consolidated packs are formed by the curing of the resin formulations contained in the slurry. The chemically-removable plugs 11a are then removed. For example, this can be done by releasing packer 7 and circulating a plug-dissolving fluid into the well through tubing 6 and out through the annular space between the tubing and the casing until at least enough of the plugging particles are dissolved to provide passageways into the perforations.

In a preferred embodiment, the slurry 9 contains a relatively high concentration of packing grains suspended in a relatively viscous liquid. This ensures that the grains remain in suspension until the slurry flows through the perforations and into the reservoir, where the suspended grains are strained out against the reservoir sand. The slurry preferably contains a concentration of grains that is sufficient to form a mass of contiguous grains occupying from about 45 to 65 percent of the volume occupied by the slurry. This ensures that, when the inflow into a perforation such as 8a is terminated by a bridge plug such as 11a, the slurry-transported grains within the reservoir and perforation have been compressed into a contiguous mass that completely, or at least substantially, fills the slurry-penetrated volume 9a within the reservoir as well as the space within the perforation 8a and the perforation tunnel leading into the reservoir.

The packing grains used in the present invention can comprise substantially any relatively incompressible solid particles which (1) are substantially insoluble in the fluids usually encountered in treating or producing a well, and (2) have sizes generally within the sand or gravel size ranges. Such particles can comprise natural silicious sands or gravels, walnut shells, glass beads, hard polymers, or the like.

The self-curing resin used in the present invention can comprise substantially any resin formulation that is adapted to react at the reservoir temperature to form a resinous-grained interbonding cement. Such resins can comprise epoxy, phenol-formaldehyde, furan, alkyd, acrylic, or the like, resins. The resins preferably contain accelerators, catalysts, wetting agents, or the like modifying components that are compatible with and/or advantageous in causing the formation of a strong resin-consolidated sand pack. The resins preferably contain a coupling agent such as a silane that strengthens the resin-to-sand bonding along each resin-coated sand grain. Particularly suitable resins comprise the polar-solvent-containing self-curing epoxy resin formulations described in U.S. Pat. No. 3,621,915.

The carrier liquid used in the pack-forming slurry of the present invention can comprise substantially any pumpable liquid which is substantially inert to the well conduits and is adapted to dissolve and/or entrain the resin and suspend the packing grains. Suitable carrier liquids include oils, such as brightstocks, kerosines, diesel oils, or crude oils; aqueous liquids, such as a brine; emulsions of oil-phase and aqueous-phase liquids; and the like. The carrier liquid can contain viscosifying materials to adjust its viscosity. In a particular preferred embodiment, a solvent-containing-epoxy resin is used in conjunction with a carrier liquid, having some but a limited amount of miscibility with the resin solvent, as described in U.S. Pat. No. 3,621,915.

The concentration of the packing grains and the viscosity of the liquid in a pack-forming slurry used in this invention is preferably coordinated to provide a slurry that (1) contains enough grains to form a mass of contiguous grains that occupies a significant proportion of the space occupied by the slurry and (2) contains a liquid having a viscosity sufficient to keep that amount of packing grains suspended during a displacement of the slurry through the well conduits and into the well casing perforations. In a particularly preferred embodiment, the grain concentration is sufficient to provide a mass of contiguous grains occupying from about 45–65 percent of the volume occupied by the slurry and the slurry liquid viscosity is at least about 100 cp. (centipoise) at the temperature of the reservoir in which the pack is formed.

The plug-forming fluid-transported solid particles which are used in this invention can comprise substantially any combination of solid particles that provide a mass adapted to form chemically-removable plugs across the openings of well casing perforations into which the pack-forming slurry is displaced. Suitable solid particles include particles of benzoic acid, for example those commercially available as Divert II, supplied by Byron-Jackson, Inc.; napthalene; relatively readily hydrolyzable or oil-soluble resins, and/or waxes; mixtures of such particles with each other or with hollow spheres of metal, glass, or the like; etc. Particles of benzoic acid having effective diameters ranging from about 0.05 to 0.5 inches are particularly suitable. At relatively low reservoir temperatures, such benzoic acid particles are adapted to plug ⅜-inch perforations against a pressure differential of from about 100–1,000 psi. In a preferred embodiment, the amount of plug-forming particles is sufficient to form a mass of substantially contiguous particles occupying substantially all of the perforated interval of well casing.

The plug-forming-particle transporting fluid and/or the pack-forming-slurry and plug-forming-particle displacing fluid each can comprise substantially any fluid adapted to be pumped through well conduits. Suitable fluids include aqueous-phase or oil-phase liquids which are relatively inert to the well conduits. Such fluids are advantageously those contained in the liquid phase of the pack-forming slurry. Such liquids can advantageously contain viscosifiers or have sufficient natural viscosity to provide an effective viscosity substantially equalling that of the pack-forming slurry. The specific gravity and/or viscosity properties of such plug-forming-particle-transporting liquids should be correlated with the specific gravities of the plug-forming particles so that within the well conduits, those particles are kept adjacent to the rear end of the slug of pack-forming slurry, i.e., do not tend to float and move up within the transporting liquids. In general, the plug-forming particles can be suspended and/or simply entrained and rolled along by the transporting and/or displacing fluid. The plug-forming particles should, of course, be incorporated into the fluids being displaced into the well downstream of pumps and/or the like devices that are apt to alter the sizes of the particles. For example, they can be so-incorporated by means of gravel-adding "pots," by PIG (U.S. Pat. No. 3,384,175) injectors, cement heads, or the like.

A well test of the present process was simulated by using a 4-ft. section of 5-inch casing in which ⅜-inch and ½-inch perforations were simulated. A variety of pumping schedules were utilized to investigate the efficiency of benzoic acid particles to plug the simulated perforations. Particles of benzoic acid (Divert II) ranging from about 0.05 to 0.5 inches in effective diameter were mixed in a concentration of about 1 pound per gallon in water that contained 2 pounds per barrel of J-133, a guar gum type gelling agent (available from the Dowell Company), and had an effective viscosity of about 100 cp.

In such a test that simulated the plugging of perforations into which a pack-forming slurry was injected, the pack-forming slurry was simulated by 5 barrels of ten pound per gallon gravel slurry in gelled water that contained 60 pounds J-133 gelling agent per 1,000 gallons. A commercially available cement head was filled with about 9 pounds of the slurry of benzoic acid particles in the gelled water having a viscosity of about 130 cp. The gravel slurry was pumped through the simulated section of perforated casing at a rate of about 1 barrel per minute. This caused the slurry to flow out through the perforations at about 8 gallons per minute. The mass of benzoic acid particles was injected as soon as possible behind the rear end of the gravel slurry slug and, when that mass reached the perforations, the flow was cut to about 1.5 gallons per minute. Such a performance, under the severe conditions of the test, is believed to provide a good indication that such a mass of benzoic acid particles will bridge across and plug the perforations of a well casing into which a pack-forming slurry in injected.

What is claimed is:

1. In a well treating process in which a slurry of packing grains, self-curing resin, and carrier liquid is injected to form a permeable resin-consolidated mass of grains in or around the borehole of a well, the improvement which comprises:

displacing said slurry into a perforated section of well casing immediately ahead of a fluid-transported mass of solid particles that have a size and composition adapting them to form chemically-removable plugs across the openings of perforations into which the slurry has been displaced;

displacing substantially all of the pack-forming slurry out of the perforated section of well casing to contact an adjacent portion of an earth formation with a portion of the pack-forming slurry while displacing the plug-forming particles into that section of the casing and the openings of the perforations within it, so that the opening of each casing perforation is plugged while the perforation is substantially completely filled with a continuous body of the pack-forming slurry that extends into contact with said adjacent portion of an earth formation; and after allowing the resinous components of the pack-forming slurry to cure, chemically removing said chemically-removable plugs that formed across the openings of perforations.

2. The process of claim 1 in which said plug-forming solid particles are particles of benzoic acid.

3. The process of claim 2 in which said well casing perforations have diameters of about ⅜-inch and said plug-forming particles have effective sizes ranging from about 0.05 to 0.5-inch.

4. The process of claim 3 in which the amount of said plug-forming particles is sufficient to form a contiguous mass of particles substantially filling the perforated portion of the well casing.

5. The process of claim 1 in which said self-curing resin and carrier liquid comprise a combination of a polar-solvent-containing epoxy resin and a carrier liquid that is partially but incompletely miscible with the polar-solvent contained in the resin.

6. The process of claim 5 in which the concentration of packing grains in the slurry of packing grains is sufficient to form a contiguous mass of grain that occupies from about 45–65 percent of the volume occupied by the slurry.

7. The process of claim 1 in which at least one portion of a slurry of packing grains, self-curing resin, and carrier liquid contains substantially gravel-sized packing grains that are adapted to form a relatively highly permeable consolidated mass and that portion of the slurry is injected immediately behind a portion of such a slurry that contains smaller sized packing grains.

8. In a well treating process in which an earth formation treating fluid is displaced through the perforations in a perforated section of well casing to contact and effect a treatment in the adjacent earth formations, the improvement which comprises:

displacing the earth formation treating fluid into the perforated section of casing ahead of a fluid-transported mass of solid particles that have a size and composition adapting them to form chemically-removable plugs across the openings of the perforations through which the treating fluid is displaced;

displacing substantially all of the earth formation treating fluid out of the perforated section of well casing through the perforations therein and forming chemically-soluble plugs cross the openings of said well casing perforations while each of those perforations are substantially completely filled with a continuous body of the treating fluid; and after allowing time for the earth formation treating fluid to effect a treatment of the earth formations, chemically removing the chemically-removable plugs.

9. The process of claim 8 in which the earth formation treating liquid is a resin formulation from which a self-curing sand consolidating resin is precipitated.

* * * * *

PO-1050
(5/69)

UNITED STATES PATENT OFFICE
CERTIFICATE OF CORRECTION

Patent No. 3,826,310      Dated July 30, 1974

Inventor(s) GEORGE THOMAS KARNES and RANDOLPH HERBERT KNAPP

It is certified that error appears in the above-identified patent and that said Letters Patent are hereby corrected as shown below:

The inventorship should read:

"Inventors:  George Thomas Karnes and
Randolph Herbert Knapp, Houston, Texas"

Signed and sealed this 22nd day of October 1974.

(SEAL)
Attest:

McCOY M. GIBSON JR.
Attesting Officer

C. MARSHALL DANN
Commissioner of Patents